(12) United States Patent
Shekhar et al.

(10) Patent No.: US 12,317,070 B2
(45) Date of Patent: May 27, 2025

(54) DEVICE AUTHENTICATION AND NETWORK FUNCTION REGISTRATION AND DISCOVERY FOR 5G VERTICAL NETWORKS

(71) Applicant: Cisco Technology, Inc., San Jose, CA (US)

(72) Inventors: Ravi Shekhar, Maharastra (IN); Vimal Srivastava, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 512 days.

(21) Appl. No.: 17/813,845

(22) Filed: Jul. 20, 2022

(65) Prior Publication Data

US 2024/0031803 A1 Jan. 25, 2024

(51) Int. Cl.
*H04W 12/06* (2021.01)
*H04W 12/08* (2021.01)
*H04W 60/00* (2009.01)

(52) U.S. Cl.
CPC ........... *H04W 12/06* (2013.01); *H04W 12/08* (2013.01); *H04W 60/00* (2013.01)

(58) Field of Classification Search
CPC .............................. H04W 12/06; H04W 12/08
See application file for complete search history.

(56) References Cited

U.S. PATENT DOCUMENTS

| 10,070,344 B1* | 9/2018 | Dowlatkhah | H04W 28/16 |
| 10,785,652 B1 | 9/2020 | Ravindranath et al. | |
| 10,887,798 B2* | 1/2021 | Dowlatkhah | H04W 76/10 |
| 12,207,354 B2* | 1/2025 | Shekhar | H04L 67/55 |
| 2011/0211559 A1* | 9/2011 | Lim | H04W 36/02 370/331 |
| 2018/0084427 A1* | 3/2018 | Huo | H04W 12/041 |

(Continued)

FOREIGN PATENT DOCUMENTS

| EP | 3849252 A1 | 7/2021 |
| WO | 2022021139 A1 | 2/2022 |

OTHER PUBLICATIONS

A. Cárdenas, D. Fernández, C. M. Lentisco, R. F. Moyano and L. Bellido, "Enhancing a 5G Network Slicing Management Model to Improve the Support of Mobile Virtual Network Operators," in IEEE Access, vol. 9, pp. 131382-131399, 2021. (Year: 2021).*

(Continued)

*Primary Examiner* — Kari L Schmidt
(74) *Attorney, Agent, or Firm* — Polsinelli P.C.

(57) ABSTRACT

The present disclosure provides solutions to registration and discovery of NFs in the vertical 5G networks, at the operator network, as well as handling tasks such as authentication of connecting end terminals at the operator network level. In one aspect, a method includes receiving, at network controller of an operator network and from an end terminal, a request for access to a network function (NF) of a vertical network, the request including a type of the NF in the vertical network; authenticating, at the network controller, the end terminal; upon authenticating the end terminal, identifying, at the network controller, the NF requested by the end terminal based at least on the type of the NF included in the request; and facilitating, by the network controller, access to the NF in the vertical network by the end terminal.

20 Claims, 11 Drawing Sheets

(56) References Cited

U.S. PATENT DOCUMENTS

| | | | |
|---|---|---|---|
| 2019/0124508 A1 | 4/2019 | Mahmoud et al. | |
| 2019/0261180 A1* | 8/2019 | Lei | H04W 8/04 |
| 2020/0137174 A1 | 4/2020 | Stammers et al. | |
| 2020/0178125 A1* | 6/2020 | Dowlatkhah | H04W 24/02 |
| 2020/0314615 A1 | 10/2020 | Patil et al. | |
| 2021/0051477 A1* | 2/2021 | Suh | H04W 60/00 |
| 2021/0058780 A1* | 2/2021 | Yu | H04W 12/08 |
| 2021/0083965 A1* | 3/2021 | Taft | H04L 1/0016 |
| 2021/0144061 A1* | 5/2021 | Agarwal | H04L 41/0896 |
| 2021/0204126 A1 | 7/2021 | Tang | |
| 2021/0219218 A1* | 7/2021 | Chen | H04W 88/06 |
| 2021/0258861 A1 | 8/2021 | Wang et al. | |
| 2021/0258864 A1 | 8/2021 | Jeong | |
| 2021/0281468 A1* | 9/2021 | Al-Kanani | H04W 4/50 |
| 2022/0038999 A1 | 2/2022 | Sapra et al. | |
| 2022/0086145 A1* | 3/2022 | Lei | H04W 12/72 |
| 2022/0174488 A1* | 6/2022 | Lei | H04W 12/06 |
| 2022/0174514 A1* | 6/2022 | Kahn | H04W 76/12 |
| 2022/0201593 A1 | 6/2022 | Baek et al. | |
| 2022/0272533 A1* | 8/2022 | Lei | H04W 12/06 |
| 2022/0312295 A1* | 9/2022 | Hashemi | H04W 40/34 |
| 2024/0064510 A1* | 2/2024 | Karakoc | H04W 12/041 |
| 2025/0016560 A1* | 1/2025 | Kim | H04W 12/03 |

OTHER PUBLICATIONS

Dan Xia, Chun Jiang, Jiafu Wan, Jiong Jin, Victor C. M. Leung, and Miguel Martinez-García. 2022. Heterogeneous Network Access and Fusion in Smart Factory: A Survey. ACM Comput. Surv. 55, 6, Article 113 (Dec. 2022), 31 pages. (Year: 2022).*

K. Sood, S. Yu, D. D. N. Nguyen, Y. Xiang, B. Feng and X. Zhang, "A Tutorial on Next Generation Heterogeneous IoT Networks and Node Authentication," in IEEE Internet of Things Magazine, vol. 4, No. 4, pp. 120-126, Dec. 2021. (Year: 2021).*

S. D. A. Shah, M. A. Gregory and S. Li, "Cloud-Native Network Slicing Using Software Defined Networking Based Multi-Access Edge Computing: A Survey," in IEEE Access, vol. 9, pp. 10903-10924, 2021. (Year: 2021).*

Nokia, et al., "Draft for Network slice Specific Authentication Procedures," 3rd Generation Partership Project (3GPP), Mobile Competence Centre; vol. SA WG3; No. Reno, US, Oct. 14, 2019-Oct. 18, 2019, Dec. 3, 2019, pages.

International Search Report and Written Opinion for PCT Application No. PCT/US2023/069799, mailed Oct. 5, 2023, 11 pages.

* cited by examiner

| Attribute name | Data type | P | Cardinality | Description |
|---|---|---|---|---|
| nfInstanceId | NfInstanceId | M | 1 | Unique identity of the NF Instance. |
| nfType | NFType | M | 1 | Type of Network Function |
| nfStatus | NFStatus | M | 1 | Status of the NF Instance (NOTE 5) |
| nfInstanceName | string | O | 0..1 | Human readable name of the NF Instance |
| heartBeatTimer | integer | C | 0..1 | Time in seconds expected between 2 consecutive heart-beat messages from an NF Instance to the NRF. It may be included in the registration request. When present in the request it shall contain the heartbeat time proposed by the NF service consumer. It shall be included in responses from NRF to registration requests (PUT) or in NF profile updates (PUT or PATCH). If the proposed heartbeat time is acceptable by the NRF based on the local configuration, it shall use the same value as in the registration request; otherwise the NRF shall override the value using a preconfigured value. |
| plmnList | array(PlmnId) | C | 1..N | PLMN(s) of the Network Function (NOTE 7). This IE shall be present if this information is available for the NF. If not provided, PLMN ID(s) of the PLMN of the NRF are assumed for the NF. |
| verticalNetworkType | VerticalNFType | C | 1 | If the NF belongs to a vertical network then type of the vertical network |
| allowedPlmns | array(PlmnId) | O | 1..N | PLMNs allowed to access the NF instance. If not provided, any PLMN is allowed to access the NF. A change of this attribute shall not trigger a "NF_PROFILE_CHANGED" notification from NRF, and this attribute shall not be included in profile change notifications to subscribed NFs. |
| allowedSnpns | array(PlmnIdNid) | O | 1..N | SNPNs allowed to access the NF instance. If this attribute is present in the NFService and in the NF profile, the attribute from the NFService shall prevail. The absence of this attribute in both the NFService and in the NF profile indicates that no SNPN, other than the SNPN(s) registered in the snpnsList attribute of the NF Profile, is allowed to access the service instance. A change of this attribute shall not trigger a "NF_PROFILE_CHANGED" notification from NRF, and this attribute shall not be included in profile change notifications to subscribed NFs. |

| Attribute name | Data type | P | Cardinality | Description |
|---|---|---|---|---|
| serviceInstanceId | string | M | 1 | Unique ID of the service instance within a given NF Instance |
| serviceName | ServiceName | M | 1 | Name of the service instance (e.g. "nudm-sdm") |
| versions | array(NFServiceVersion) | M | 1..N | The API versions supported by the NF Service and if available, the corresponding retirement date of the NF Service. The different array elements shall have distinct unique values for "apiVersionInUri", and consequently, the values of "apiFullVersion" shall have a unique first digit version number. |
| scheme | UriScheme | M | 1 | URI scheme (e.g. "http", "https") |
| nfServiceStatus | NFServiceStatus | M | 1 | Status of the NF Service Instance (NOTE 3) |
| fqdn | Fqdn | O | 0..1 | FQDN of the NF Service Instance (NOTE 1) |
| allowedPlmns | array(PlmnId) | O | 1..N | PLMNs allowed to access the service instance (NOTE 5).. |
| allowedSnpns | array(PlmnIdNid) | O | 1..N | SNPNs allowed to access the service instance. |
| allowedNfTypes | array(NFType) | O | 1..N | Type of the NFs allowed to access the service instance. |
| ...... | ...... | ... | ...... | ............ |
| allowedVerticalNFTypes | array(VerticalNFType) | O | 1..N | List of vertical NF Types which are allowed to access this service instance. If this is missing, then this service is allowed for all network types. |

DEVICE AUTHENTICATION AND NETWORK FUNCTION REGISTRATION AND DISCOVERY FOR 5G VERTICAL NETWORKS

TECHNICAL FIELD

The subject matter of this disclosure relates in general to the field of computer networking, and more particularly, to providing connectivity to vertical 5G networks by one or more end terminals, wherein the vertical 5G networks each have a limited set of network functions and each are communicatively coupled to an underlying 5G network configured to register and discover network functions in the vertical 5G networks and handle authentication of the one or more end terminals.

BACKGROUND

Current mobile and wireless communication systems have widely adopted a next-generation wireless communication system, 5G that provides much higher data rates and lower latency. With the 5G evolution, a concept known as Private 5G (P5G) has been introduced. P5G uses 5G-enabled technologies (e.g., 3GPP access), but allows the owner to provide priority access or licensing for its wireless spectrum or dedicated bandwidth. As follows, an enterprise can be provided with an isolated 5G network, which can be dedicated to the enterprise for its specific use cases.

$3^{rd}$ Generation Partnership Project (3GPP) studies about enhancement of $5^{th}$ Generation (5G) services to support vertical networks are underway. Vertical networks are industry-specific network which are customized 5G network with only a limited number of network functions (NFs) compared to standalone 5G networks (e.g., NFs including Application Management Function (AMF), Session Management Function (SMF), User Plane Function (UPF), and/or Unified Data Management (UDM)). Vertical customers may wish to have dedicated NFs so that they can manage their own data but not necessary dedicate resources to other NFs such as Home subscriber service (HSS) and Authentication Server Function (AUSF) which are used for user authentication.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not, therefore, to be considered to be limiting of its scope, the principles herein are described and explained with additional specificity and detail through the use of the accompanying drawings in which:

FIG. 5 illustrates an example NF profile with NFtype information, according to some aspects of the present disclosure;

FIG. 6 illustrates an example NF service, according to some aspects of the present disclosure;

DETAILED DESCRIPTION

Figure 1A:
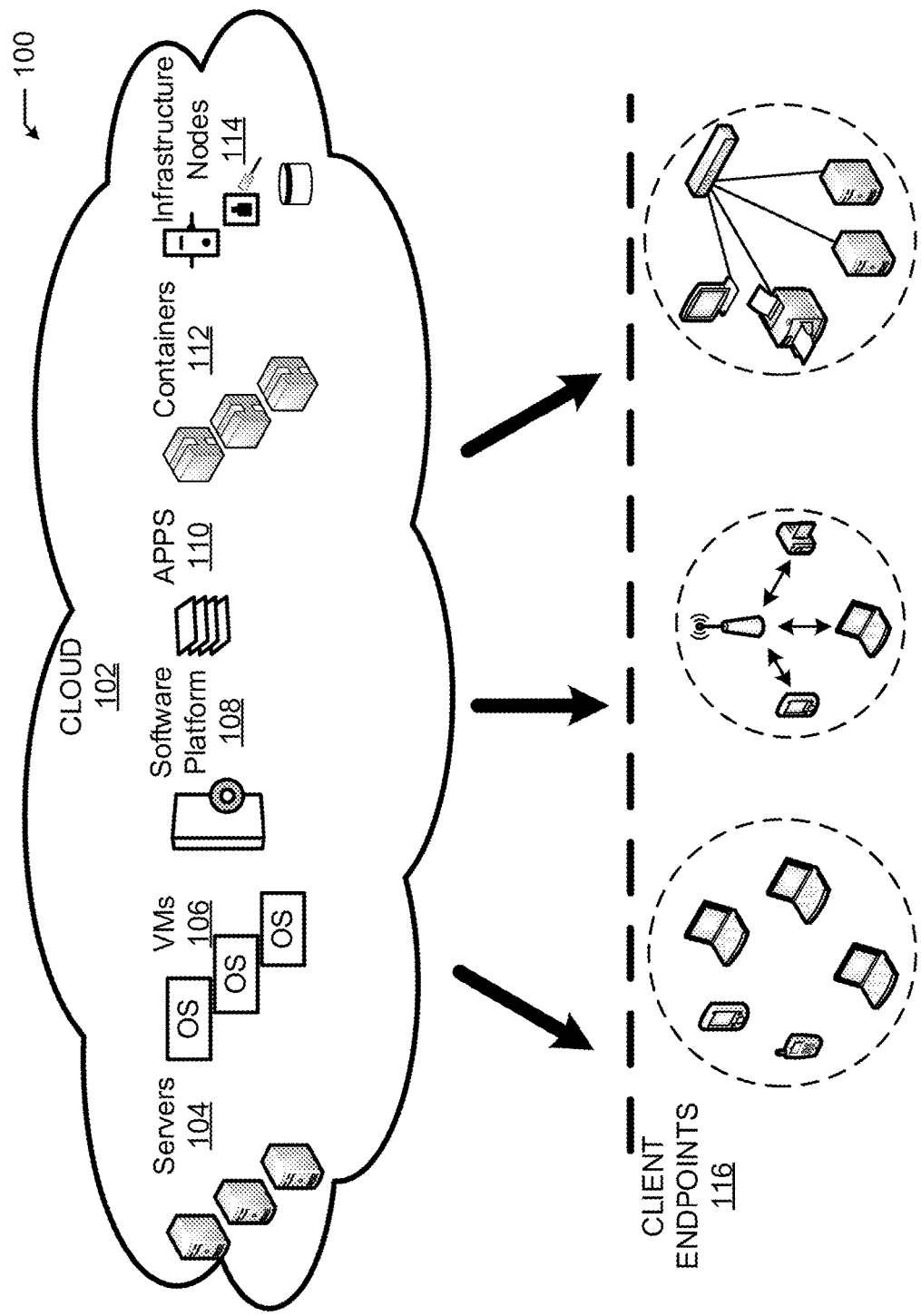
FIG. 1A illustrates an example cloud computing architecture, according to some aspects of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

Overview

Disclosed herein are systems, methods, and computer-readable media for addressing challenges associated with discovery and selection of network functions (NFs) in vertical 5G networks and handling of authenticating of end terminals belonging to vertical networks. As noted above, vertical customers may wish to have dedicated NFs (a vertical network slice with limited NFs) so that they can manage their own data but not necessary dedicate resources to other NFs such as user authentication, etc. Accordingly, such other NFs may be handled by a common underlying operator network that is communicatively coupled to multiple vertical 5G networks. The present disclosure provides solutions to discovery and selection of NFs in the vertical 5G networks, at the operator network upon receiving an access request from an end terminal, as well as handling tasks such as authentication of connecting end terminals at the operator network level.

In one aspect, a method includes receiving, at network controller of an operator network and from an end terminal, a request for access to a network function (NF) of a vertical network, the request including a type of the NF in the vertical network, the operator network being configured to authenticate the end terminal and enable the end terminal to access the NF of the vertical network, the vertical network having a limited number of dedicated NFs with remaining NFs being provided by the operator network; authenticating, at the network controller, the end terminal; upon authenticating the end terminal, identifying, at the network controller, the NF requested by the end terminal based at least on the type of the NF included in the request; and facilitating, by the network controller, access to the NF in the vertical network by the end terminal.

In another aspect, the method further includes receiving, at the operator network, a registration request from each NF in the vertical network, the registration request including an identification of a type for the vertical network.

In another aspect, the registration request further defines a service type for a corresponding NF, the service type, the type of the vertical network and the type of the NF included in the request being used by the operator network to identify the NF for the end terminal.

In another aspect, the vertical network only includes NFs corresponding to application management function (AMF), session management function (SMF), and user plane function (UPF), and the end terminal is authenticated using Unified Data Management (UDM) function and authentication server function (AUSF) at the operator network.

In another aspect, the vertical network includes NFs corresponding to application management function (AMF), session management function (SMF), unified data management (UDM) user plane function (UPF), and the end terminal is authenticated using an authentication server function (AUSF) of the operator network.

In another aspect, the operator network is communicatively coupled to two or more vertical networks and is responsible for authenticating a plurality of end terminals requesting access to one or more NFs in any of the two or more vertical networks.

In another aspect, the operator network includes a service communication proxy (SCP) component and a corresponding dedicated SCP for each vertical network to establish indirect communication between the operator network and each vertical network.

In another aspect, a network controller of an operator network includes one or more memories having computer-readable instructions stored thereon and one or more processors. The one or more processors are configured to execute the computer-readable instructions to receive, from an end terminal, a request for access to a network function (NF) of a vertical network, the request including a type of the NF in the vertical network, the operator network being configured to authenticate the end terminal and enable the end terminal to access the NF of the vertical network, the vertical network having a limited number of dedicated NFs with remaining NFs being provided by the operator network; authenticate the end terminal; upon authenticating the end terminal, identify the NF requested by the end terminal based at least on the type of the NF included in the request; and facilitate access to the NF in the vertical network by the end terminal.

In another aspect, one or more non-transitory computer-readable media include computer-readable instructions, which when executed by one or more processors associated with a network controller at an operator network, cause the network controller to receive, from an end terminal, a request for access to a network function (NF) of a vertical network, the request including a type of the NF in the vertical network, the operator network being configured to authenticate the end terminal and enable the end terminal to access the NF of the vertical network, the vertical network having a limited number of dedicated NFs with remaining NFs being provided by the operator network; authenticate the end terminal; upon authenticating the end terminal, identify the NF requested by the end terminal based at least on the type of the NF included in the request; and facilitate access to the NF in the vertical network by the end terminal.

DESCRIPTION OF EXAMPLE EMBODIMENTS

The following acronyms are used throughout the present disclosure, provided below for convenience.
AAA: Authentication Authorization Accounting
AF: Application Function
AMF: Access and Mobility Management Function
CGW: Converged Gateway CHF: Charging Function
MBR: Modify Bearer Request
MME: Mobility Management Entity
NAS: Non-Access Stratum
OCS: Online charging system
PCF: Policy Control Function
PCRF: Policy and Charging Rules Function
PGW: Packet Data Network (PDN) Gateway
SCEF: Service Capability Exposure Function
SGW: Serving Gateway
SMF: Session Management Function
SPGW: Serving/PDN Gateway
TAU: Tracking Area Update
UPF: User Plane Function
UDM: Unified Data Management
HSS: Home Subscriber Server
AUST: Authentication Server Function
NRF: Network Function Repository Function
NSSF: Network Slice Selection Function As noted above, $3^{rd}$ Generation Partnership Project (3GPP) studies about enhancement of $5^{th}$ Generation (5G) services to support vertical 5G networks are underway. Vertical 5G networks are industry-specific network which are customized 5G network with only a limited number of network functions (NFs) compared to standalone 5G networks (e.g., NFs including Application AMF, SMF, UPF, and/or UDM). Vertical customers (e.g., businesses and enterprises using 5G services) may wish to have dedicated NFs so that they can manage their own data but not necessary dedicate resources to other NFs such as user authentication, etc.

For vertical customers, they may either wish to have dedicated AMF, SMF, and UPF NFs only (Case 1) or alternatively, may also have the additional NF of UDM that may include subscription data of users of vertical customers (Case 2).

For both cases, the following challenges exist. First challenge is network discovery because the vertical 5G network does include a NRF. Second challenge is that NFs in operator's network may face the risk of being attacked by vertical NFs. Therefore, there is a need for a selection mechanism for end terminals to select NFs from vertical 5G network using NRF in operator 5G network—outside of vertical 5G network. The third challenge is indirect communication between NFs of a vertical 5G network and NFs of an operator 5G network.

The present disclosure provides solutions to all these challenges by providing a modified messaging format and structure for registering NFs in a vertical 5G network and discovering NF services as well as a modified structure for using 5G SCPs in both the vertical 5G networks and the operator 5G network for purposes of handling indirect communications and hiding network topologies.

Throughout this disclosure terms vertical network and vertical 5G network may be used interchangeably. Similarly, terms operator network and operator 5G network and anchor network, may be used interchangeably. While the present disclosure is described with reference to the specific example of a 5G network, the underlying concepts are not limited to being application to networks. A person of ordinary skill in the art can readily appreciate that appropriate modifications to the messaging format and specifications described herein, can enable one to equally apply the same concepts to other types of networks including 4G/LTE and/or to be developed communication standards beyond 5G.

The disclosure begins with examples of enterprise networks in which 5G services may be utilized. These examples will be described with reference to FIGS. 1A and 1B followed by a description of an example 5G network with reference to FIG. 2.

FIG. 1A illustrates a diagram of an example cloud computing architecture, according to some aspects of the present disclosure. Architecture 100 can include a cloud 102. The cloud 102 can include one or more private clouds, public clouds, and/or hybrid clouds. Moreover, the cloud 102 can include cloud elements 104-114. The cloud elements 104-114 can include, for example, servers 104, virtual machines (VMs) 106, one or more software platforms 108, applications or services 110, software containers 112, and infrastructure nodes 114. The infrastructure nodes 114 can include various types of nodes, such as compute nodes, storage nodes, network nodes, management systems, etc.

The cloud 102 can provide various cloud computing services via the cloud elements 104-114, such as software as a service (SaaS) (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

The client endpoints 116 can connect with the cloud 102 to obtain one or more specific services from the cloud 102. The client endpoints 116 can communicate with elements 104-114 via one or more public networks (e.g., Internet), private networks, and/or hybrid networks (e.g., virtual private network). The client endpoints 116 can include any device with networking capabilities, such as a laptop computer, a tablet computer, a server, a desktop computer, a smartphone, a network device (e.g., an access point, a router, a switch, etc.), a smart television, a smart car, a sensor, a GPS device, a game system, a smart wearable object (e.g., smartwatch, etc.), a consumer object (e.g., Internet refrigerator, smart lighting system, etc.), a city or transportation system (e.g., traffic control, toll collection system, etc.), an internet of things (IoT) device, a camera, a network printer, a transportation system (e.g., airplane, train, motorcycle, boat, etc.), or any smart or connected object (e.g., smart home, smart building, smart retail, smart glasses, etc.), and so forth.

The client endpoints 116 can communicate with the elements 104-114 as part of accessing network services through infrastructure intermediation messaging. Specifically, communications between the elements 104-114 and the client endpoints 116 can be managed and otherwise controlled through a network infrastructure between the client endpoints 116 and the cloud 102. For example, any of a 5G infrastructure, an LTE infrastructure and a Wi-Fi infrastructure can communicate a physical location of a client endpoint to a cloud service. In turn, the cloud service can cause the infrastructure to send specific signaling to the client endpoint for accessing network services through the cloud service. For example, the cloud service can use the LTE infrastructure, e.g. through an LTE S14 interface, to alert the client endpoint of Wi-Fi availability through the Wi-Fi infrastructure. In another example, the cloud service can use the Wi-Fi infrastructure, e.g. through MBO Wi-Fi messaging, to alert the client endpoint of LTE availability through the LTE infrastructure.

Figure 1B:
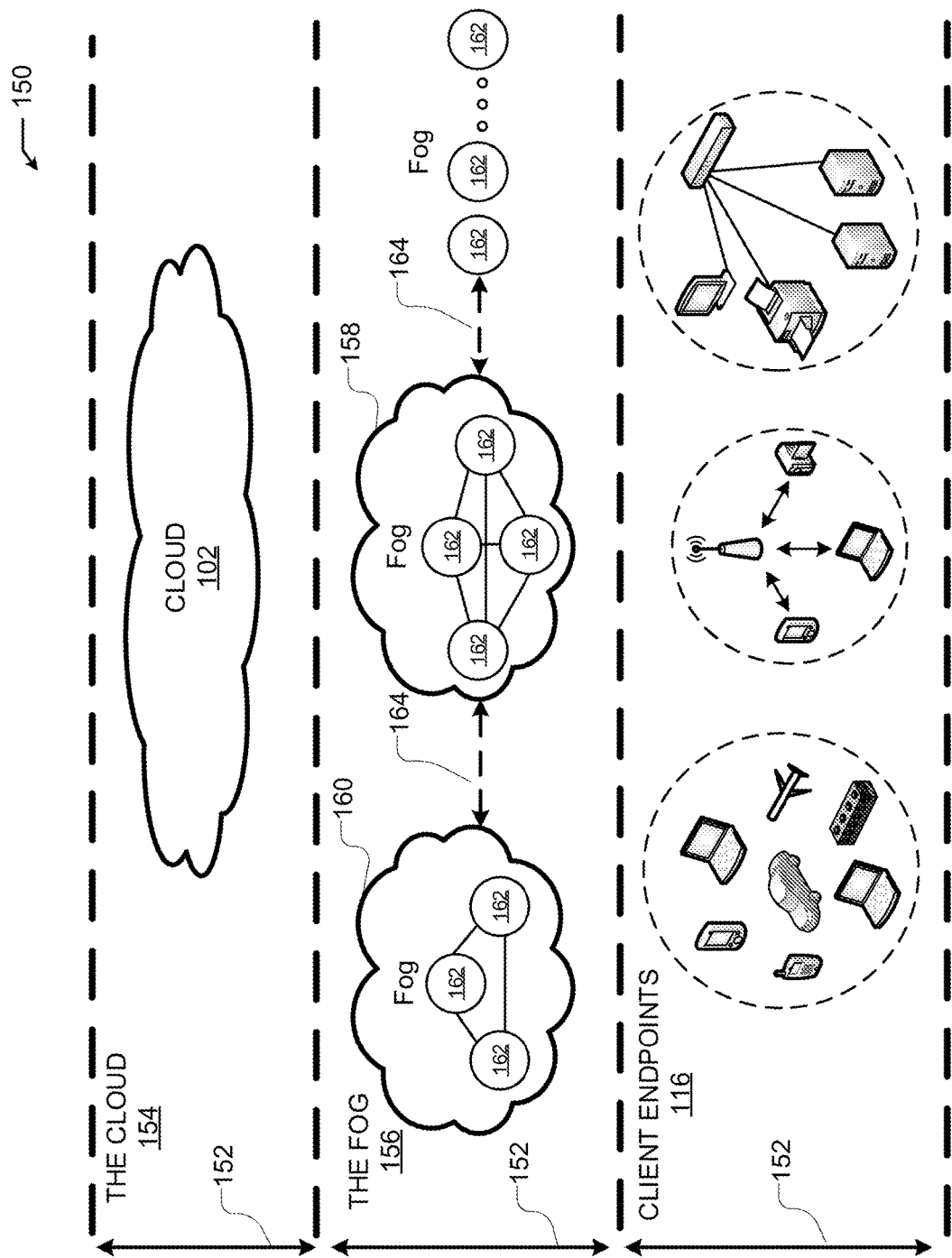
FIG. 1B illustrates an example fog computing architecture, according to some aspects of the present disclosure.

FIG. 1B illustrates a diagram of an example fog computing architecture, according to some aspects of the present disclsoure. Fog computing architecture 150 can include the cloud layer 154, which includes the cloud 102 and any other cloud system or environment, and the fog layer 156, which includes fog nodes 162. The client endpoints 116 can communicate with the cloud layer 154 and/or the fog layer 156. The architecture 150 can include one or more communication links 152 between the cloud layer 154, the fog layer 156, and the client endpoints 116. Communications can flow up to the cloud layer 154 and/or down to the client endpoints 116.

The fog layer 156 or "the fog" provides the computation, storage and networking capabilities of traditional cloud networks, but closer to the endpoints. The fog can thus extend the cloud 102 to be closer to the client endpoints 116. The fog nodes 162 can be the physical implementation of fog networks. Moreover, the fog nodes 162 can provide local or regional services and/or connectivity to the client endpoints 116. As a result, traffic and/or data can be offloaded from the cloud 102 to the fog layer 156 (e.g., via fog nodes 162). The fog layer 156 can thus provide faster services and/or connectivity to the client endpoints 116, with lower latency, as well as other advantages such as security benefits from keeping the data inside the local or regional network(s).

The fog nodes 162 can include any networked computing devices, such as servers, switches, routers, controllers, cameras, access points, gateways, etc. Moreover, the fog nodes 162 can be deployed anywhere with a network connection, such as a factory floor, a power pole, alongside a railway track, in a vehicle, on an oil rig, in an airport, on an aircraft, in a shopping center, in a hospital, in a park, in a parking garage, in a library, etc.

In some configurations, one or more fog nodes 162 can be deployed within fog instances 158, 160. The fog instances 158, 160 can be local or regional clouds or networks. For example, the fog instances 158, 160 can be a regional cloud or data center, a local area network, a network of fog nodes 162, etc. In some configurations, one or more fog nodes 162 can be deployed within a network, or as standalone or individual nodes, for example. Moreover, one or more of the fog nodes 162 can be interconnected with each other via links 164 in various topologies, including star, ring, mesh or hierarchical arrangements, for example.

In some cases, one or more fog nodes 162 can be mobile fog nodes. The mobile fog nodes can move to different geographic locations, logical locations or networks, and/or fog instances while maintaining connectivity with the cloud layer 154 and/or the endpoints 116. For example, a particular fog node can be placed in a vehicle, such as an aircraft or train, which can travel from one geographic location and/or logical location to a different geographic location and/or logical location. In this example, the particular fog node may connect to a particular physical and/or logical connection point with the cloud 154 while located at the starting location and switch to a different physical and/or logical connection point with the cloud 154 while located at the destination location. The particular fog node can thus move within particular clouds and/or fog instances and, therefore, serve endpoints from different locations at different times.

Figure 2:
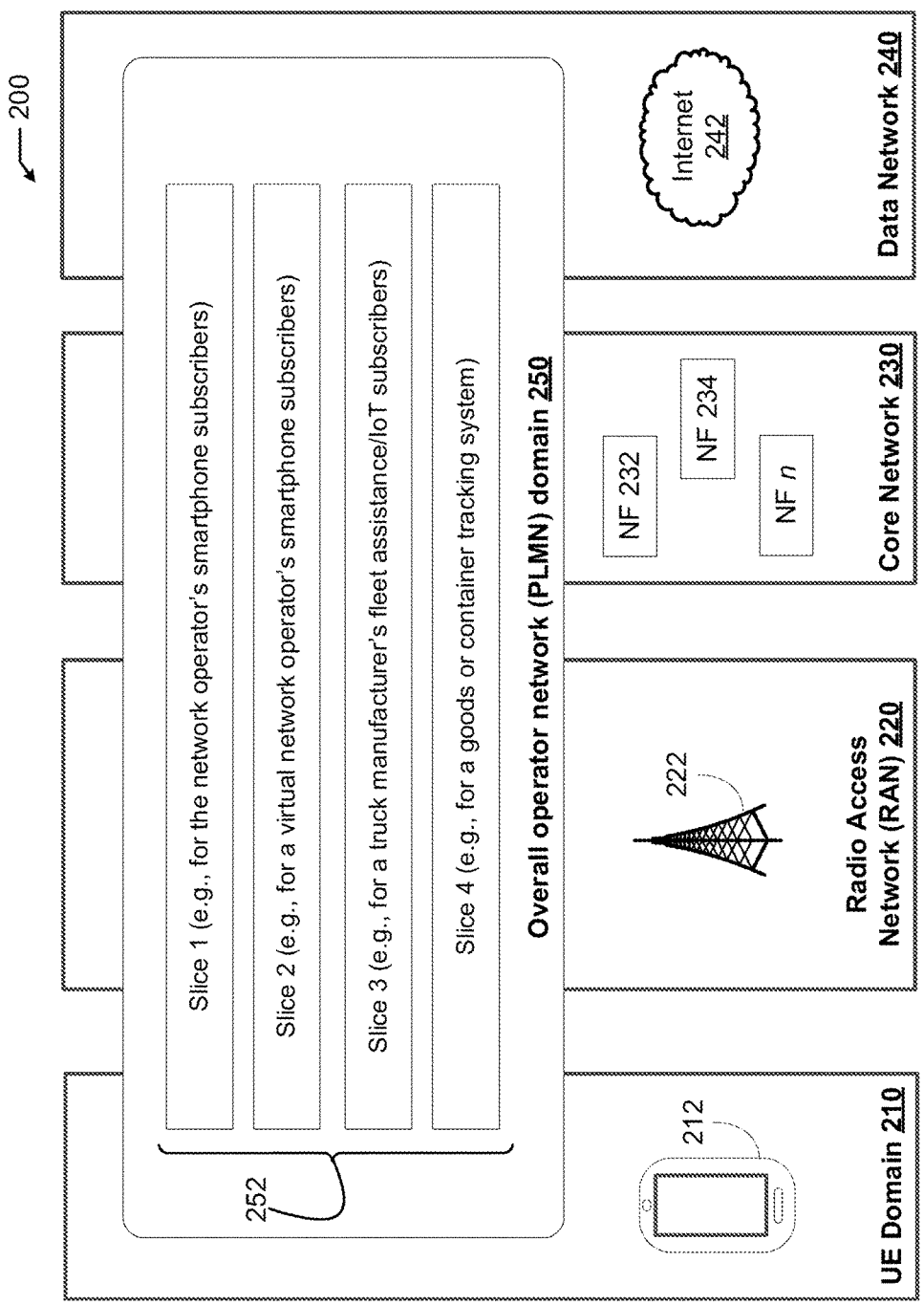
FIG. 2 depicts an exemplary schematic representation of a 5G network environment in which network slicing has been implemented, and in which one or more aspects of the present disclosure may operate, according to some aspects of the present disclosure.

FIG. 2 depicts an exemplary schematic representation of a 5G network environment in which network slicing has been implemented, and in which one or more aspects of the present disclosure may operate, according to some aspects of the present disclosure. As illustrated, network environment 200 is divided into four domains, each of which will be explained in greater depth below; a User Equipment (UE) domain 210, e.g. of one or more enterprise, in which a plurality of user cellphones or other connected devices 212 reside; a Radio Access Network (RAN) domain 220, in which a plurality of radio cells, base stations, towers, or other radio infrastructure 222 resides; a Core Network 230, in which a plurality of Network Functions (NFs) 232, 234, . . . , n reside; and a Data Network 240, in which one or more data communication networks such as the Internet 242 reside. Additionally, the Data Network 240 can support SaaS providers configured to provide SaaS to enterprises, e.g. to users in the UE domain 210.

Core Network 230 contains a plurality of Network Functions (NFs), shown here as NF 232, NF 234 . . . NF n. In some embodiments, core network 230 is a 5G core network (5GC) in accordance with one or more accepted 5GC architectures or designs. In some embodiments, core network 230 is an Evolved Packet Core (EPC) network, which combines aspects of the 5GC with existing 4G networks. Regardless of the particular design of core network 230, the plurality of NFs typically executes in a control plane of core network 230, providing a service based architecture in which a given NF allows any other authorized NFs to access its services. For example, a Session Management Function (SMF) controls session establishment, modification, release, etc., and in the course of doing so, provides other NFs with access to these constituent SMF services.

In some embodiments, the plurality of NFs of core network 230 can include one or more Access and Mobility Management Functions (AMF; typically used when core network 230 is a 5GC network) and Mobility Management Entities (MME; typically used when core network 230 is an EPC network), collectively referred to herein as an AMF/MME for purposes of simplicity and clarity. In some embodiments, an AMF/MME can be common to or otherwise shared by multiple slices of the plurality of network slices 252, and in some embodiments an AMF/MME can be unique to a single one of the plurality of network slices 252.

The same is true of the remaining NFs of core network 230, which can be shared amongst one or more network slices or provided as a unique instance specific to a single one of the plurality of network slices 252. In addition to NFs comprising an AMF/MME as discussed above, the plurality of NFs of the core network 230 can additionally include one or more of the following: User Plane Functions (UPFs); Policy Control Functions (PCFs); Authentication Server Functions (AUSFs); Unified Data Management functions (UDMs); Application Functions (AFs); Network Exposure Functions (NEFs); NF Repository Functions (NRFs); and Network Slice Selection Functions (NSSFs). Various other NFs can be provided without departing from the scope of the present disclosure, as would be appreciated by one of ordinary skill in the art.

Across these four domains of the 5G network environment 200, an overall operator 5G network domain 250 is defined. The operator 5G network domain 250 is in some embodiments a Public Land Mobile Network (PLMN), and can be thought of as the carrier or business entity that provides cellular service to the end users in UE domain 210. Within the operator 5G network domain 250, a plurality of network slices 252 are created, defined, or otherwise provisioned in order to deliver a desired set of defined features and functionalities, e.g. SaaSs, for a certain use case or corresponding to other requirements or specifications. Note that network slicing for the plurality of network slices 252 is implemented in end-to-end fashion, spanning multiple disparate technical and administrative domains, including management and orchestration planes (not shown). In other words, network slicing is performed from at least the enterprise or subscriber edge at UE domain 210, through the RAN 220, through the 5G access edge and the 5G core network 230, and to the data network 240. Moreover, note that this network slicing may span multiple different 5G providers. In the context of the present disclosure, a network slice may also include a set of limited NFs that are dedicated to a specific customer network, referred to as a vertical network. Multiple vertical networks may be connected to an underlying operator network that provides NFs not available within the limited NFs dedicated to each specific customer on their respective network slice. These will be described in more detail with reference to FIGS. 3-8.

For example, as shown here, the plurality of network slices 252 include Slice 1, which corresponds to smartphone subscribers of the 5G provider who also operates network domain, and Slice 2, which corresponds to smartphone subscribers of a virtual 5G provider leasing capacity from the actual operator of network domain 250. Also shown is Slice 3, which can be provided for a fleet of connected vehicles, and Slice 4, which can be provided for an IoT goods or container tracking system across a factory network or supply chain. Note that these network slices 252 are provided for purposes of illustration, and in accordance with the present disclosure, and the operator 5G network domain 250 can implement any number of network slices as needed, and can implement these network slices for purposes, use cases, or subsets of users and user equipment in addition to those listed above. Specifically, the operator 5G network domain 250 can implement any number of network slices for provisioning SaaSs from SaaS providers to one or more enterprises.

5G mobile and wireless networks will provide enhanced mobile broadband communications and are intended to deliver a wider range of services and applications as compared to all prior generation of mobile and wireless networks. Compared to prior generations of mobile and wireless networks, the 5G architecture is service based, meaning that wherever suitable, architecture elements are defined as network functions that offer their services to other network functions via common framework interfaces. To support this wide range of services and network functions across an ever-growing base of user equipment (UE), 5G networks incorporate the network slicing concept utilized in previous generation architectures.

Within the scope of the 5G mobile and wireless network architecture, a network slice comprises a set of defined features and functionalities. An enterprise or a customer of 5G services may subscribe to a publicly available 5G network offered by a 5G service provider or may subscribe to a private 5G services. As noted above, the concept of vertical 5G networks is being proposed and considered by 3GPP. In such instance, a customer may only wish to have a certain number of NFs dedicated to the functioning of its enterprise network while remaining NFs are being handled by an underlying operator 5G network (e.g., public 5G network operator or a private 5G network operator). In other words, such customer may be given a dedicate network slice with the desired NFs while other NFs are defined and made available to one or more network slices controlled by the network operator.

Figure 3:
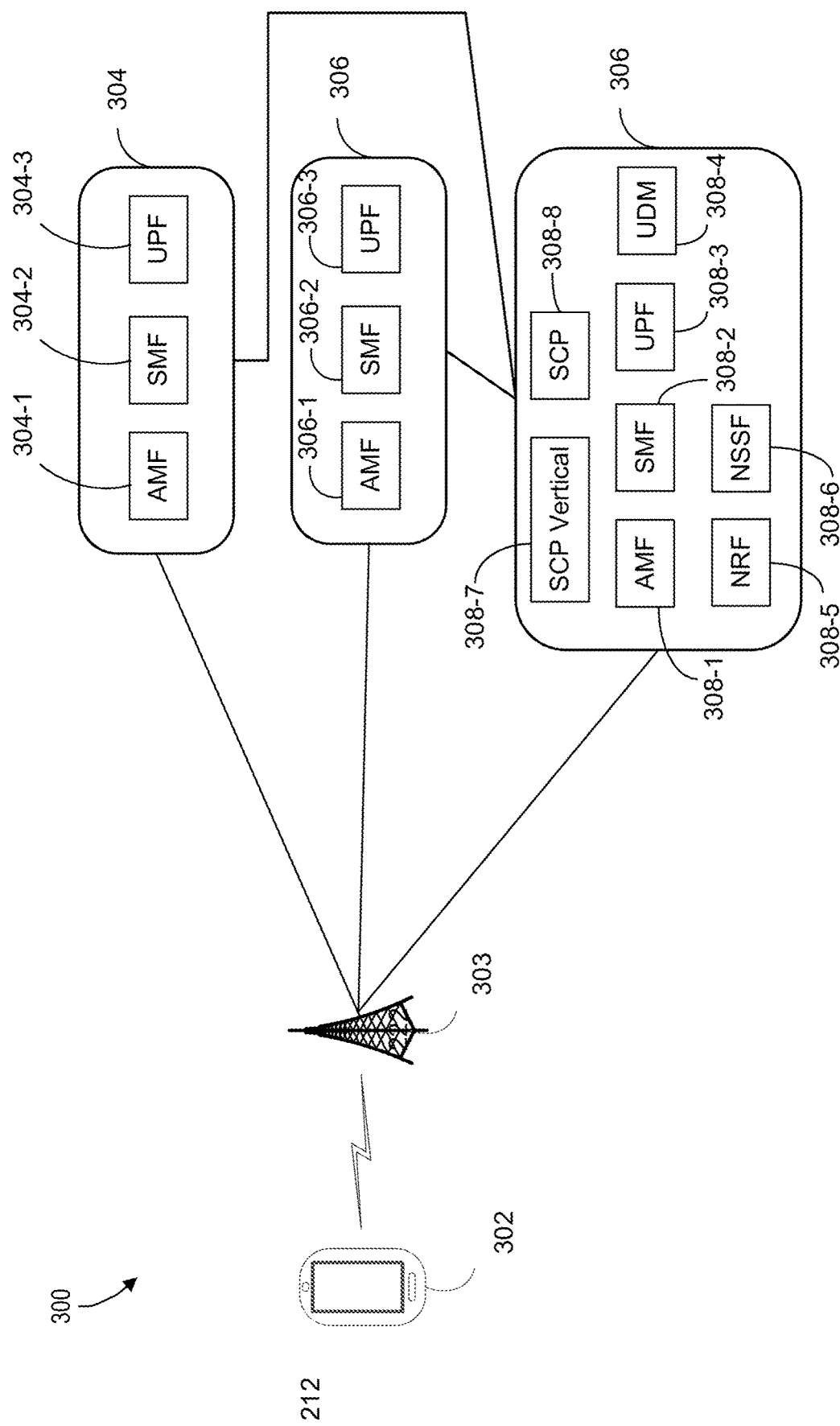
FIG. 3 illustrates an example architecture of multiple vertical 5G networks interconnected with an underlying operator network, according to some aspects of the present disclosure.

FIG. 3 illustrates an example architecture of multiple vertical 5G networks interconnected with an underlying operator 5G network, according to some aspects of the present disclosure.

Architecture 300 includes a UE 302, which may be the same as any of client endpoints 116 and UE 212 described above with reference to FIGS. 1A, 1B, and 2. UE 302 may connect to an access point 303 (e.g., a gNodeB). Architecture 300 further includes two example vertical 5G networks 304 and 306 as well as an operator 5G network 308. Each of vertical 5G networks 304 and 306 may be a dedicated network slice associated with a customer (e.g., a car manufacturer, a healthcare provider, etc.). While FIG. 3 includes two example vertical 5G networks, the present disclosure is not limited thereto and can include any number of vertical 5G networks. In one example, a single operator 5G network can be connected to and support a given number of vertical 5G networks (e.g., four, five, ten networks). Furthermore, architecture 300 can include multiple operator 5G networks such as operator 5G network 308, with each supporting a number of customer dedicated vertical 5G networks.

Vertical 5G network 304 may have a number of NFs that are dedicated to the corresponding customer. For example, the NFs can include AMF 304-1, SMF 304-2, and UPF 304-3. Similarly, vertical 5G network 304 can include dedicated NFs such as AMF 306-1, SMF 306-2, and UPF 306-3. Vertical 5G networks 304 and 306 may be examples of case 1 discussed above. Alternatively, one or more of vertical 5G networks 304 and 306 may include an additional NF, such as UDM NF corresponding to case 2 discussed above.

Operator 5G network 308 may include additional NFs for handling various other connectivity functionalities for connecting UE 302 to the corresponding vertical 5G network 304 or 306. NFs included in operator 5G network 308 may be those not specifically handled and dedicated to vertical 5G networks 304 and 306. By relying on operator 5G network 308 for the other connectivity functionalities, customers associated with vertical 5G networks 304 and 306 may run a leaner and more cost-effective network operations.

Example NFs in operator 5G network 308 include, but are not limited to, AMF 308-1, SMF 308-2, UPF 308-3, UDM 308-4, NRF 308-5, NSSF 308-6, SCP vertical 308-7, and SCP 308-8. As will be described below, NRF 308-5 may handle various functions directed to registering NFs in vertical 5G networks 304 and 306 and enable discovery and selection thereof upon receiving access requests from end points such as UE 302. SCP vertical 308-7 and SCP 308-8 will be described below with reference to challenges associated with network topology hiding and indirect communications between operator 5G network 308 and vertical 5G networks 304/306.

As noted above, when a request from UE 302 is received for connecting to one or more NFs associated with a customer, operator 5G network 308 needs to know which NFs are available and which dedicated vertical 5G networks are associated with those NFs. In other words, customer specific NFs available in their respective vertical 5G network should be registered with operator 5G network 308 for operator 5G network 308 to facilitate access to such NFs by UE 302. Protocols for registering NFs with operator 5G network 308 (e.g., with NRF 308-5) and specifying their available type (to be used by NRF 308-5 to identify the correct NF to connect UE 302 to) will be described below with reference to FIGS. 4-6.

Figure 4:
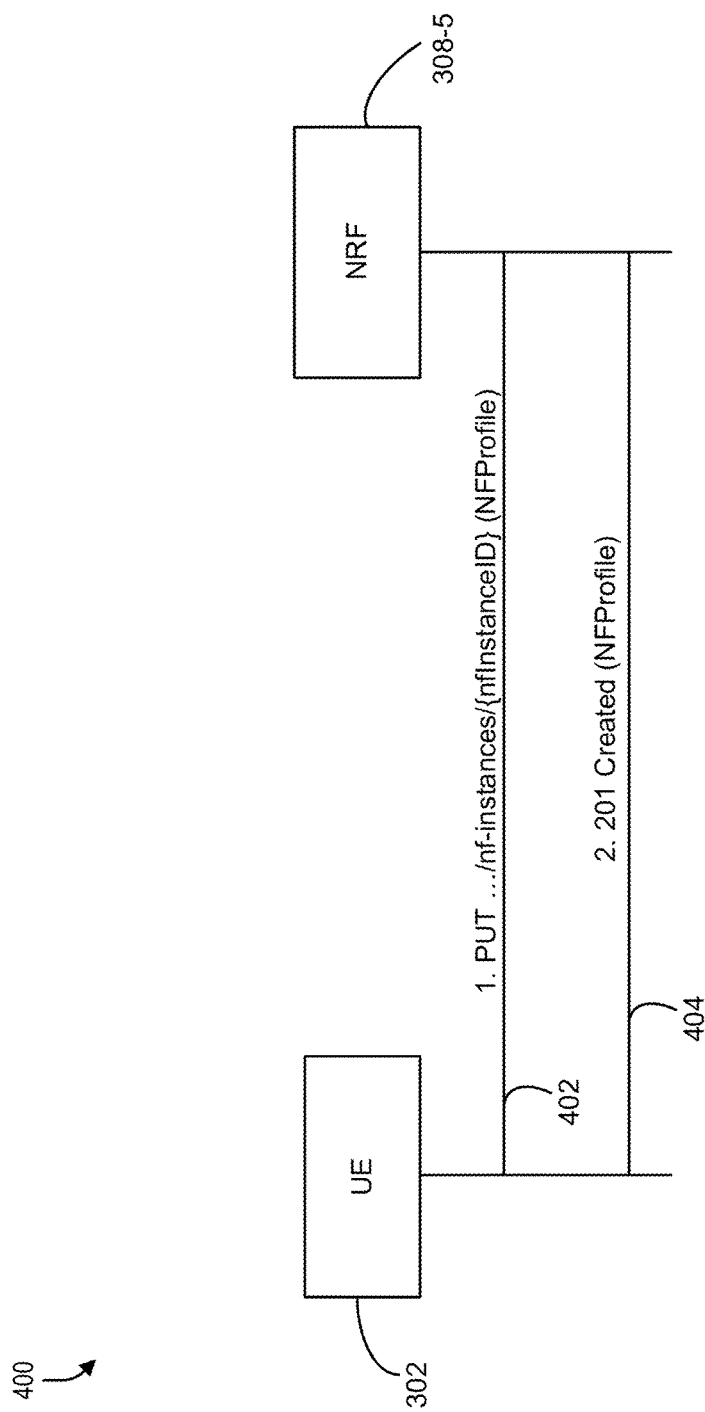
FIG. 4 illustrates an example NF registration call flow for registering a NF in a vertical 5G network with the operator network, according to some aspects of the present disclosure.

FIG. 4 illustrates an example NF registration call flow for registering a NF in a vertical 5G network with the operator 5G network, according to some aspects of the present disclosure. As noted above, one of the challenges in vertical 5G networks under consideration by 3GPP is network discovery because the vertical 5G network does include a NRF such as NRF 308-5. Another challenge is that NFs in operator's network may face the risk of being attacked by vertical NFs. Therefore, there is a need for a selection mechanism for end terminals to select NFs from vertical 5G network using NRF in operator 5G network—outside of vertical 5G network. Example embodiments described below with reference to FIGS. 4-6 address these two challenges.

All NFs in a vertical 5G network (e.g., NFs 304-1, 304-2, 304-3 in vertical 5G network 304 and/or NFs 306-1, 306-2, and 306-3 in vertical 5G network 306) may register with NRF 308-5 in operator 5G network 308 with information of network type=vertical-network (e.g., if vertical 5G network 304 is for General Motor car manufacturing company then AMF 304-1, SMF 304-2, and UPF 304-3 of the car manufacturer network can register with network type=GM-Car-Network). Network type here may be new information that NFs from vertical 5G network provide to NRF 308-5 at the time of registration (e.g., included as a new Information Element (IE) in a registration message, examples of which will be described below with reference to FIG. 5 and FIG. 6).

With all NFs registered, the process of FIG. 4 may be utilized by an end terminal to request access to one or more NFs in a vertical network. The example call flow 400 includes two steps for exchange of messages between an end terminal requesting access to NF(s) (e.g., UE 302) and NRF 308-5 inside operator 5G network 308 of FIG. 3. For example, at step 402, UE 302 may send a registration request to NRF 308-5. This registration request may be a put with a new NF profile entry (NFProfile) that indicate whether the request NF belongs to a vertical 5G network or not. This information will be used by NRF 308-5 to filter NFs registered with NRF 308-5 and identify the correct NF for UE 302. Once identified, at step 404, NRF 308-5 may respond back to UE 302 with a 201 message as defined in 3GPP 29.510.

As noted above, NFs in vertical 5G networks 304 and 306 will register with NRF 308-5 so that NRF 308-5, upon receipt of a registration message at step 402, can filter and discover the correct NF for UE 302.

3GPP 29.510 defines NF profile and information included therein. The present disclosure includes a new IE to be included in the NF profile to enable NF search and discovery by NRF 308-5. FIG. 5 illustrates an example NF profile with NFtype information, according to some aspects of the present disclosure.

NF profile example 500 of FIG. 5, along with other information elements currently defined for NF profile according to 3GPP 29.510, includes a new IE 502 that identifies a type for the vertical 5G network to the NF belongs (verticalNFType). For example, if the NF belongs to a vertical 5G network for GM, then verticalNFType value can be, for example, "GM-Network." If the NF belongs to a vertical 5G network for Ford, then verticalNFType can be, for example, "Ford-Network."

NRF 308-5 may also authenticate access to a network or an NF in a network in addition to identifying the NF to which UE 302 is requesting access. To this end, 3GPP 29.051 also defines a NF service, to which the present disclosure proposes adding a new IE.

FIG. 6 illustrates an example NF service, according to some aspects of the present disclosure. NF service example 600 of FIG. 6, along with other information elements currently defined for NF service according to 3GPP 29.510, includes a new IE 602. This new IE 602 may be referred to as allowed verticalNFTypes that may be used for service authorization. Each NF Service can indicate if it is allowed only for a set of vertical NF types or it is allowed for all.

Once a device authentication (e.g., authentication of UE 302) is performed at operator 5G network 308 (for both case 1 and case 2), as will be described below, the new IEs in NF profile and NF service may be used by NRF 308-5 for NF discovery and selection (e.g., AMF within vertical 5G network X will only connect with SMF of vertical 5G network X).

A third challenge faced when implementing vertical NFs is the indirect communication between NFs of a vertical 5G network and NFs of an operator 5G network. NFs in an underlying operator 5G network may be configured for purposes of topology hiding and traffic segregation for vertical 5G networks.

Figure 7:
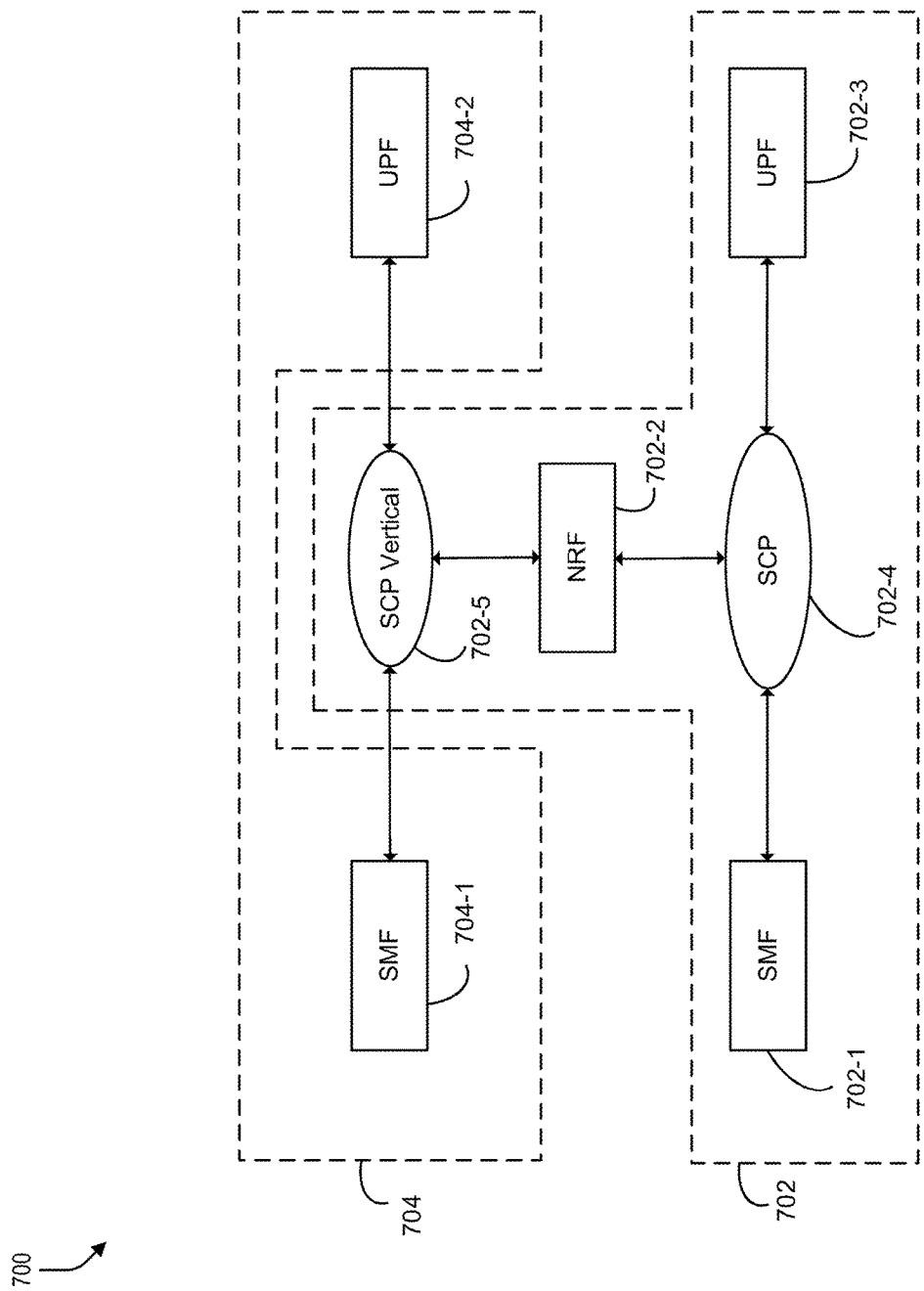
FIG. 7 illustrates an example configuration for indirect communication between an operator network and a single vertical 5G network, according to some aspects of the present disclosure.

The enhancements for Service Based Architecture (eSBA) in 5G core, as defined in 3GPP 23.501, can enable indirect communication (e.g., between operator 5G network 308 and any one of vertical 5G networks 304 and 306) and delegated discovery through Service Communication Proxy (SCP). For topology hiding purposes, a dedicated SCP for indirect communication with a vertical 5G network node may be used. A delegated discovery model (e.g., model D as defined by 3GPP eSBA architecture) may be used as there is no local NRF in the vertical 5G network. In this instance, NRF 308-5 is deployed in operator 5G network 308 and connected to both the SCPs and NFs of both network for service discovery. FIG. 7 illustrates an example configuration for indirect communication between an operator 5G network and a single vertical 5G network, according to some aspects of the present disclosure.

Architecture 700 includes operator 5G network 702, which can be the same as operator 5G network 308 (with only SMF 702-1, NRF 702-2, UPF 702-3, SCP 702-4, and SCP vertical 702-5 shown with remaining NFs shown in operator 5G network 308 omitted). Architecture 700 also includes vertical 5G network 704, which can be the same as any one of vertical 5G networks 304 or 306 (with only SMF 704-1 and UPF 704-2 while remaining NFs shown in vertical 5G network 304/306 omitted). SCP vertical 702-5 may be dedicated to a corresponding vertical 5G network. Therefore, there may be multiple SCP verticals in operator 5G network 308 corresponding to the number of vertical 5G networks communicatively coupled to operator 5G network 308 (e.g., two SCP verticals, one for vertical 5G network 304 and one for vertical 5G network 306).

Indirect communication between operator 5G network 702 and vertical 5G network 704 may be made through SCP 702-4 and dedicated vertical SCP 702-5 for vertical 5G network 704. SCP 702-4 and SCP vertical 702-5 may have functionalities as defined by 3GPP 23.501.

Figure 8:
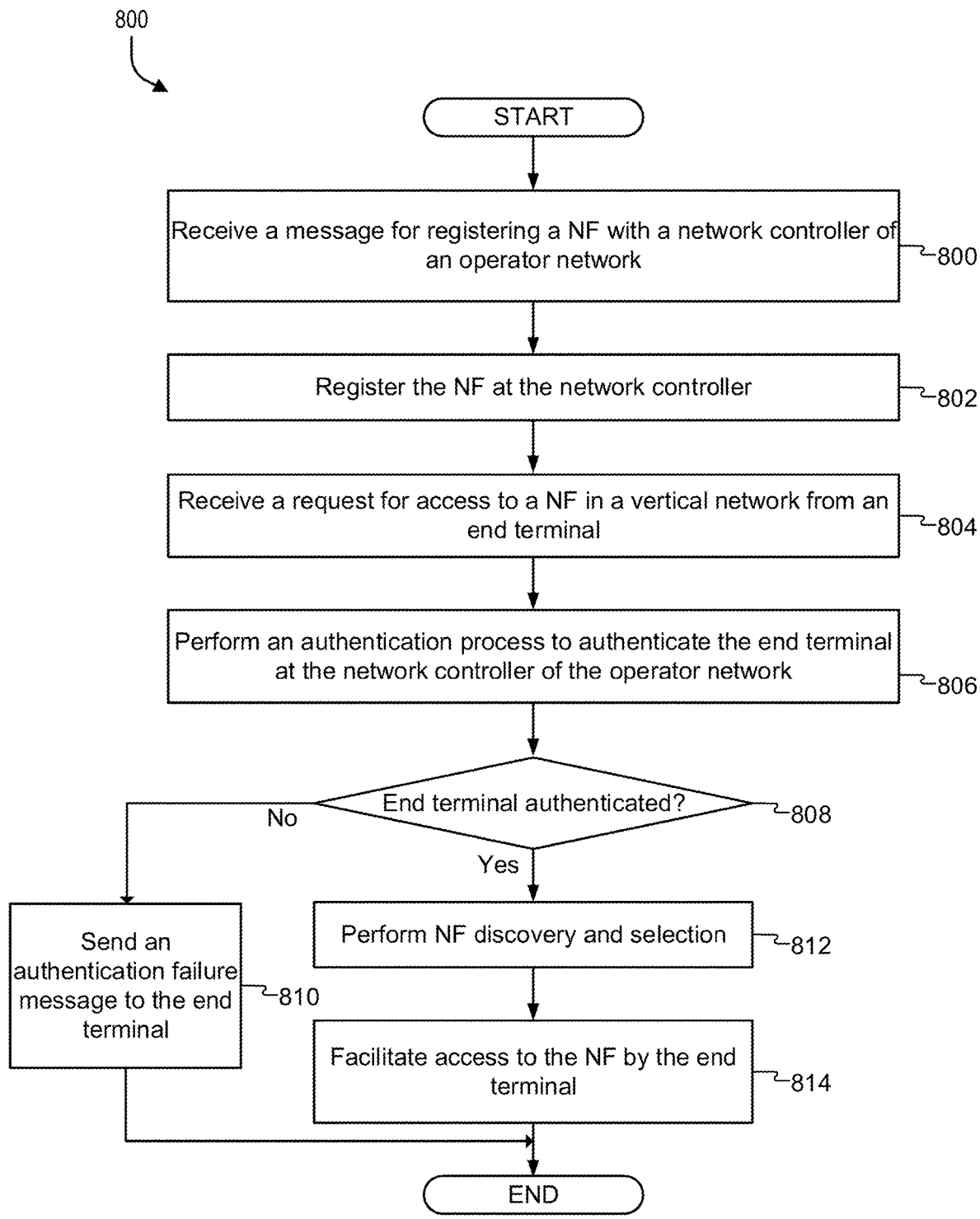
FIG. 8 describes a process of authenticating end terminals for access to NF in vertical networks and NF discovery and selection, according to some aspects of the present disclosure.

With examples of architectures and messaging specifications for vertical 5G network NF discovery and selection and device authentication at NRF of an operator 5G network described with reference to FIGS. 1-7, FIG. 8 describes a process of authenticating end terminals for access to NF in vertical 5G networks and NF discovery and selection, according to some aspects of the present disclosure. FIG. 8 will be described from the perspective of a network controller of operator 5G network 308. Such network controller can have one or more associated memories having computer-readable instructions, which when executed by one or more associated processors at one or more components of operator 5G network 308, can cause the network controller to perform steps of FIG. 8 described below. Such network controller can be a component of operator 5G network 308 implementing functionalities of NRF 308-5 (or any other network function of operator 5G network 308 configured to authenticate end devices and perform vertical NF discovery and selection). In describing FIG. 8 references may be made to FIGS. 3-7.

At step 800, a network controller (e.g., NRF 308-5) of operator 5G network 308 (e.g., operator 5G network) receives a message from a NF in a vertical 5G network (vertical network) communicatively coupled to operator 5G network 308 for registering with NRF of operator 5G network 308. This message may have the same format as NF type message described above with reference to FIG. 5 and NF service message described above with reference to FIG. 6. While step 800 indicates that a NF in a vertical 5G network may proactively request registration with a NRF in the operator 5G network, in other examples, network controller (e.g., NRF 308-5) may proactively inquire with vertical NF networks for registering their respective NFs (e.g., when a new vertical 5G network is brought online or new NF(s) is/are added to an existing vertical 5G network).

At step 802, network controller of operator 5G network 308, may register the NF and store the same in a repository or a database associated with operator 5G network 308. This process may be performed according to any known or to be developed method.

Steps 800 and 802 of FIG. 8 may not be performed continuously as registration of NFs with network controller occurs only once and stored for future discovery and selection upon request.

At step 804, network controller of operator 5G network 308 may receive a request for access to a NF in a vertical 5G network from an end terminal (e.g., UE 302). Such request may be the same as the PUT message described with reference to step 402 of FIG. 4. The request may include a type of NF requested (e.g., the NFProfile included in PUT message described above with reference to FIG. 4). As described above, the operator 5G network (e.g., operator network 308) may be configured to authenticate the end terminal and enable the end terminal to access one or more NFs of a vertical 5G network (e.g., one of NFs 304 and 306) that has a limited number of dedicated NFs with remaining NFs being provided by the operator 5G network.

At step 806, network controller of operator 5G network 308 may perform an authentication process to authenticate the end terminal using known or to be developed processes for authenticating end terminals requesting access or attachment to a 5G core network of a network provider. In example of case 1 described above, where a vertical 5G network (e.g., vertical 5G network 304 or 306) only has dedicated AMF, SMF, and UPF functions, the network controller of operator 5G network 308 performing the authentication at step 806 is NRF 308-5. In performing the authentication, NRF 308-5 may utilize UDM/HSS/AUSF NFs of operator 5G network 308 to perform the authentication. In another example of case 2, wherein each vertical 5G network also includes a UDM NF that includes subscription information of users of that particular vertical 5G network, NRF 308-5 may utilize HSS/AUSF NFs of operator 5G network 308 to perform the authentication while UDM inside the corresponding vertical 5G network may be used for all other purposes.

At step 808, network controller of operator 5G network 308 may determine if the end terminal is authenticated or not. If not (NO at step 808), at step 810, network controller may send an authentication failure message to the end terminal denying access to the end terminal (e.g., an access failed or denied message).

However, if network controller of operator 5G network 308 successfully authenticates the end terminal (YES at step 808), then at step 812, network controller of operator 5G network 308 may perform a NF discovery and selection process using the type of NF indicated in the request message received from the end terminal at step 804. Using the type indicated in the request message and stored information on NF Type and NF service (as described above with reference to FIGS. 5 and 6), network controller of operator 5G network 308 may identify the vertical 5G network and the corresponding NF(s) to connect the end terminal to.

At step 814, network controller of operator 5G network 308 may facilitate access to the NF for the end terminal. In one example, network controller may send a message back to the end terminal (e.g., UE 302) indicating a successful identification of the requested NF allowing the end terminal to either directly or indirectly through operator 5G network 308, access the NF. The message sent may be the same as the 201 message described above with reference to FIG. 4. Facilitating access to the selected NF may be done according to any known or to be developed method.

Figure 9:
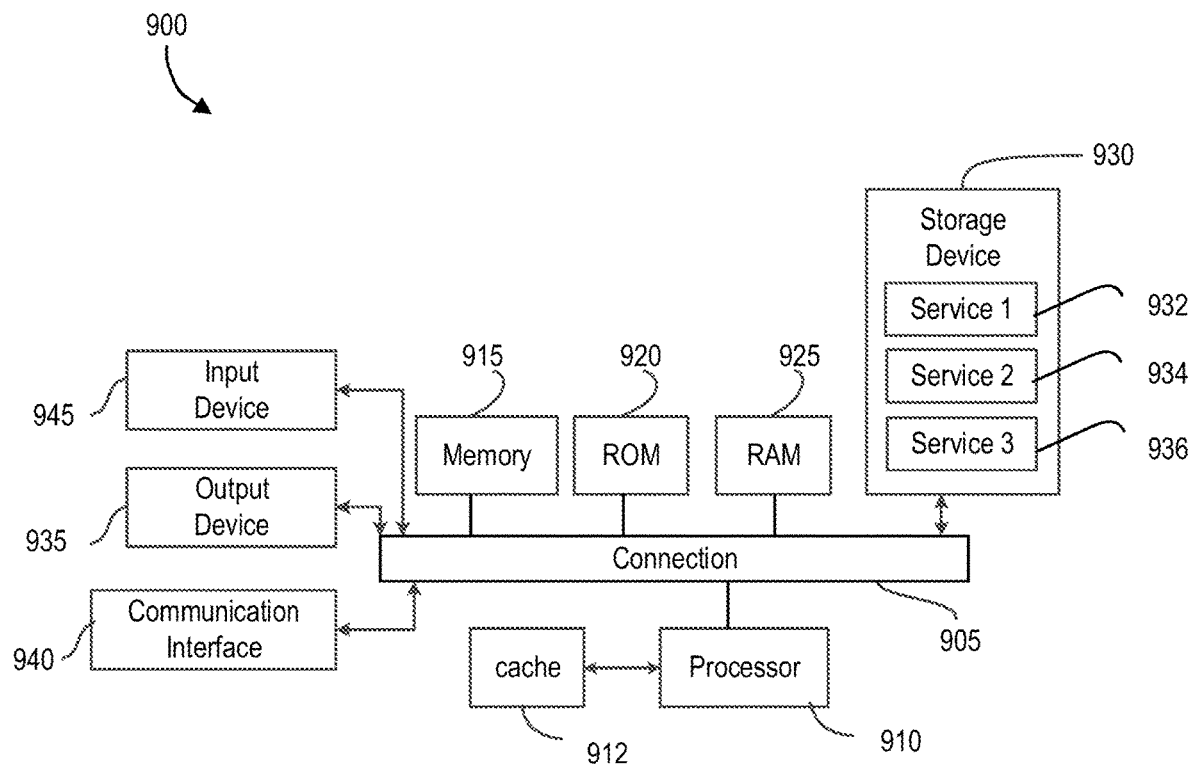
FIG. 9 illustrates an example network device, according to some aspects of the present disclosure.
Figure 10:
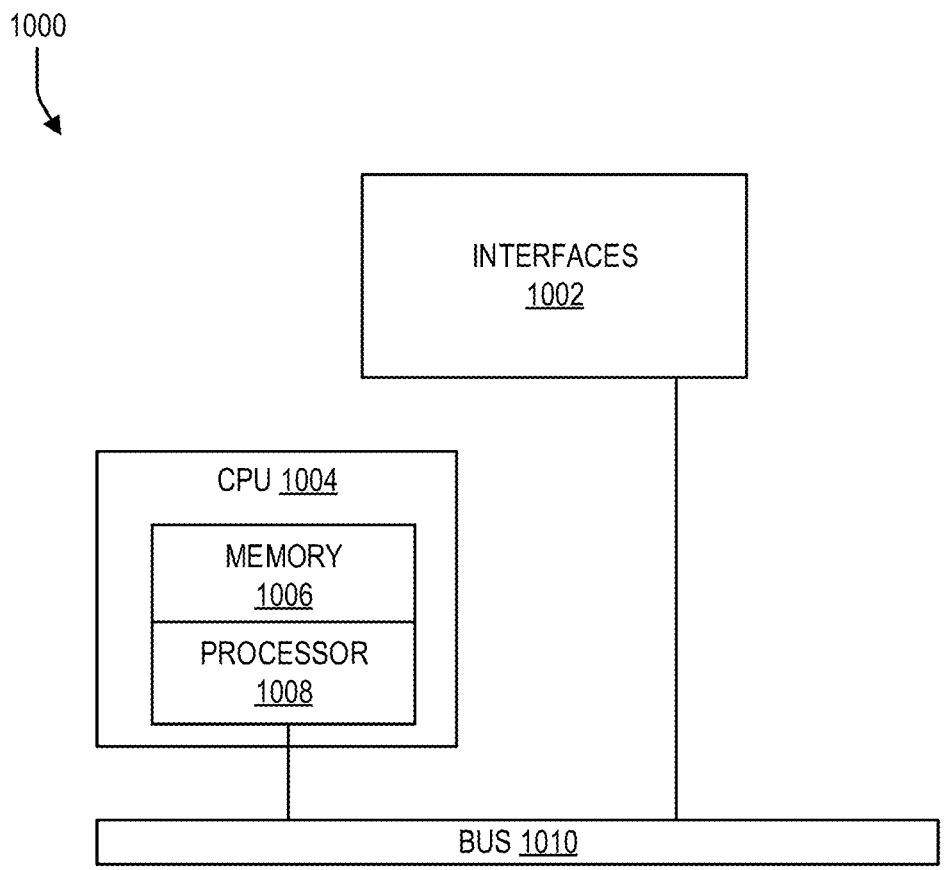
FIG. 10 shows an example computing system, which can be for example any computing device that can implement components of the system.

Following disclosure with respect to FIGS. 9 and 10 illustrates example network devices and computing devices that may be used to implement various components described above with reference to FIGS. 1-8 including, but not limited to, network controller of FIG. 8 (e.g., NRF 308-5)

FIG. 9 illustrates an example computing system, according to some aspects of the present disclosure. Computing system 900 can include components in electrical communication with each other using a connection 905 upon which one or more aspects of the present disclosure can be implemented. Connection 905 can be a physical connection via a bus, or a direct connection into processor 910, such as in a chipset architecture. Connection 905 can also be a virtual connection, networked connection, or logical connection.

In some embodiments computing system 900 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 900 includes at least one processing unit (CPU or processor) 910 and connection 905 that couples various system components including system memory 915, such as read only memory (ROM) 920 and random access memory (RAM) 925 to processor 910. Computing system 900 can include a cache of high-speed memory 912 connected directly with, in close proximity to, or integrated as part of processor 910.

Processor 910 can include any general purpose processor and a hardware service or software service, such as services 932, 934, and 936 stored in storage device 930, configured to control processor 910 as well as a special-purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric.

To enable user interaction, computing system 900 includes an input device 945, which can represent any number of input mechanisms, such as a microphone for speech, a touch-sensitive screen for gesture or graphical input, keyboard, mouse, motion input, speech, etc. Computing system 900 can also include output device 935, which can be one or more of a number of output mechanisms known to those of skill in the art. In some instances, multimodal systems can enable a user to provide multiple types of input/output to communicate with computing system 900. Computing system 900 can include communications interface 940, which can generally govern and manage the user input and system output. There is no restriction on operating on any particular hardware arrangement and therefore the basic features here may easily be substituted for improved hardware or firmware arrangements as they are developed.

Storage device 930 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 930 can include software services, servers, services, etc., that when the code that defines such software is executed by the processor 910, it causes the system to perform a function. In some embodiments, a hardware service that performs a particular function can include the software component stored in a computer-readable medium in connection with the necessary hardware components, such as processor 910, connection 905, output device 935, etc., to carry out the function.

FIG. 10 shows an example computing system, which can be for example any computing device that can implement components of the system. Network device 1000 includes a central processing unit (CPU) 1004, interfaces 1002, and a bus 1010 (e.g., a PCI bus). When acting under the control of appropriate software or firmware, the CPU 1004 is responsible for executing packet management, error detection, and/or routing functions. The CPU 1004 preferably accomplishes all these functions under the control of software including an operating system and any appropriate applications software. CPU 1004 may include one or more processors 1008, such as a processor from the INTEL X86 family of microprocessors. In some cases, processor 1008 can be specially designed hardware for controlling the operations of network device 1000. In some cases, a memory 1006 (e.g., non-volatile RAM, ROM, etc.) also forms part of CPU 1004. However, there are many different ways in which memory could be coupled to the system.

The interfaces 1002 are typically provided as modular interface cards (sometimes referred to as "line cards"). Generally, they control the sending and receiving of data packets over the network and sometimes support other peripherals used with the network device 1000. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master CPU 1004 to efficiently perform routing computations, network diagnostics, security functions, etc.

Although the system shown in FIG. 10 is one specific network device of the present technology, it is by no means the only network device architecture on which the present technology can be implemented. For example, an architecture having a single processor that handles communications as well as routing computations, etc., is often used. Further, other types of interfaces and media could also be used with the network device 1000.

Regardless of the network device's configuration, it may employ one or more memories or memory modules (including memory 1006) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 1006 could also hold various software containers and virtualized execution environments and data.

The network device 1000 can also include an application-specific integrated circuit (ASIC), which can be configured to perform routing and/or switching operations. The ASIC can communicate with other components in the network device 1000 via the bus 1010, to exchange data and signals and coordinate various types of operations by the network device 1000, such as routing, switching, and/or data storage operations, for example.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. A method comprising:
   receiving, at network controller of an operator network and from an end terminal, a request for access to a network function (NF) of a vertical network, the request including a type of the NF in the vertical network, the operator network being configured to authenticate the end terminal and enable the end terminal to access the NF of the vertical network, the vertical network having a limited number of dedicated NFs with remaining NFs being provided by the operator network;
   authenticating, at the network controller, the end terminal;
   upon authenticating the end terminal, identifying, at the network controller, the NF requested by the end terminal based at least on the type of the NF included in the request; and
   facilitating, by the network controller, access to the NF in the vertical network by the end terminal.

2. The method of claim 1, further comprising:
   receiving, at the operator network, a registration request from each NF in the vertical network, the registration request including an identification of a type for the vertical network.

3. The method of claim 2, wherein the registration request further defines a service type for a corresponding NF, the service type, the type of the vertical network and the type of the NF included in the request being used by the operator network to identify the NF for the end terminal.

4. The method of claim 1, wherein
   the vertical network only includes NFs corresponding to application management function (AMF), session management function (SMF), and user plane function (UPF), and
   the end terminal is authenticated using Unified Data Management (UDM) function and authentication server function (AUSF) at the operator network.

5. The method of claim 1, wherein
   the vertical network includes NFs corresponding to application management function (AMF), session management function (SMF), unified data management (UDM) user plane function (UPF), and
   the end terminal is authenticated using an authentication server function (AUSF) of the operator network.

6. The method of claim 1, wherein the operator network is communicatively coupled to two or more vertical networks and is responsible for authenticating a plurality of end terminals requesting access to one or more NFs in any of the two or more vertical networks.

7. The method of claim 1, wherein the operator network includes a service communication proxy (SCP) component and a corresponding dedicated SCP for each vertical network to establish indirect communication between the operator network and each vertical network.

8. A network controller of an operator network comprising:
   one or more memories having computer-readable instructions stored thereon; and
   one or more processors configured to execute the computer-readable instructions to:
      receive, from an end terminal, a request for access to a network function (NF) of a vertical network, the request including a type of the NF in the vertical network, the operator network being configured to authenticate the end terminal and enable the end terminal to access the NF of the vertical network, the vertical network having a limited number of dedicated NFs with remaining NFs being provided by the operator network;
      authenticate the end terminal;
      upon authenticating the end terminal, identify the NF requested by the end terminal based at least on the type of the NF included in the request; and
      facilitate access to the NF in the vertical network by the end terminal.

9. The network controller of claim 8, wherein the one or more processors are further configured to execute the computer-readable instructions to receive a registration request from each NF in the vertical network, the registration request including an identification of a type for the vertical network.

10. The network controller of claim 9, wherein the registration request further defines a service type for a corresponding NF, the service type, the type of the vertical network and the type of the NF included in the request being used by the operator network to identify the NF for the end terminal.

11. The network controller of claim 8, wherein
the vertical network only includes NFs corresponding to application management function (AMF), session management function (SMF), and user plane function (UPF), and
the end terminal is authenticated using Unified Data Management (UDM) function and authentication server function (AUSF) at the operator network.

12. The network controller of claim 8, wherein
the vertical network includes NFs corresponding to application management function (AMF), session management function (SMF), unified data management (UDM) user plane function (UPF), and
the end terminal is authenticated using an authentication server function (AUSF) of the operator network.

13. The network controller of claim 8, wherein the operator network is communicatively coupled to two or more vertical networks and is responsible for authenticating a plurality of end terminals requesting access to one or more NFs in any of the two or more vertical networks.

14. The network controller of claim 8, wherein the operator network includes a service communication proxy (SCP) component and a corresponding dedicated SCP for each vertical network to establish indirect communication between the operator network and each vertical network.

15. One or more non-transitory computer-readable media comprising computer-readable instructions, which when executed by one or more processors associated with a network controller at an operator network, cause the network controller to:
receive, from an end terminal, a request for access to a network function (NF) of a vertical network, the request including a type of the NF in the vertical network, the operator network being configured to authenticate the end terminal and enable the end terminal to access the NF of the vertical network, the vertical network having a limited number of dedicated NFs with remaining NFs being provided by the operator network;
authenticate the end terminal;
upon authenticating the end terminal, identify the NF requested by the end terminal based at least on the type of the NF included in the request; and
facilitate access to the NF in the vertical network by the end terminal.

16. The one or more non-transitory computer-readable media of claim 15, wherein the execution of the computer-readable instructions further cause the network controller to receive a registration request from each NF in the vertical network, the registration request including an identification of a type for the vertical network.

17. The one or more non-transitory computer-readable media of claim 16, wherein the registration request further defines a service type for a corresponding NF, the service type, the type of the vertical network and the type of the NF included in the request being used by the operator network to identify the NF for the end terminal.

18. The one or more non-transitory computer-readable media of claim 15, wherein
the vertical network only includes NFs corresponding to application management function (AMF), session management function (SMF), and user plane function (UPF), and
the end terminal is authenticated using Unified Data Management (UDM) function and authentication server function (AUSF) at the operator network.

19. The one or more non-transitory computer-readable media of claim 15, wherein
the vertical network includes NFs corresponding to application management function (AMF), session management function (SMF), unified data management (UDM) user plane function (UPF), and the end terminal is authenticated using an authentication server function (AUSF) of the operator network.

20. The one or more non-transitory computer-readable media of claim 15, wherein the operator network includes a service communication proxy (SCP) component and a corresponding dedicated SCP for each vertical network to establish indirect communication between the operator network and each vertical network.

* * * * *